(12) United States Patent
Liu

(10) Patent No.: US 6,470,875 B2
(45) Date of Patent: Oct. 29, 2002

(54) SMOKE COOKER WITH A CHIMNEY

(75) Inventor: Chung-Ye Liu, Taipei (TW)

(73) Assignee: Dalvey Products Supply Ltd., Taipei (TW)

( * ) Notice: Subject to any disclaimer, the term of this patent is extended or adjusted under 35 U.S.C. 154(b) by 26 days.

(21) Appl. No.: 09/784,921

(22) Filed: Feb. 16, 2001

(65) Prior Publication Data

US 2002/0112716 A1 Aug. 22, 2002

(51) Int. Cl.$^7$ ................................................ F24B 1/182
(52) U.S. Cl. ........................ 126/25 R; 126/506; 99/467
(58) Field of Search ................................. 126/25 R, 28, 126/500, 506, 505, 275 R, 312; 99/467

(56) References Cited

U.S. PATENT DOCUMENTS

| | | | |
|---|---|---|---|
| 2,725,872 A | * 12/1955 | Richards | 126/25 R |
| 2,933,080 A | * 4/1960 | Adey | 126/25 R |
| 4,489,706 A | * 12/1984 | Hait | 126/25 R |
| 6,328,029 B1 | * 12/2001 | Nuter | 126/25 R |

* cited by examiner

Primary Examiner—Sara Clarke
(74) Attorney, Agent, or Firm—William E. Pelton, Esq.

(57) ABSTRACT

A smoke cooker with a chimney has a base, a cover detachably connected with the base, a chimney detachably connected with the cover and a lid assembly mountable on the chimney. The smoke cooker is able to be separated into an oven portion and a chimney portion so as to function differently. When the oven and the chimney portions are assembled, the smoke cooker is able to be used to roast food or cure food with smoke.

20 Claims, 5 Drawing Sheets

SMOKE COOKER WITH A CHIMNEY

BACKGROUND OF THE INVENTION

1. Field of the Invention

The present invention relates to a smoke cooker, and more particularly to a smoke cooker with a chimney. The smoke cooker has a base which can be used as an oven, a grate on which food can be heated up and a chimney with which food can be smoke cured.

2. Description of Related Art

Normally, a BBQ grate is only for heating food on the grate and an outdoor oven functions only to roast food inside the oven. That is, either one has only one function and can not be used in both purposes. Furthermore, when using smoke to cure food, a user will have to use a special device to achieve the desired function. That is, each one of the foregoing devices is designed to have only one function. Still further is that the conventional BBQ grate or the outdoor oven is heavy in weight and occupies a great deal of space when in storage.

To overcome the shortcomings, the present invention tends to provide an improved smoke cooker with a chimney to mitigate and obviate the aforementioned problems.

SUMMARY OF THE INVENTION

The primary objective of the invention is to provide an improved smoke cooker with a chimney to combine the functions of an oven, a BBQ grate and a smoke cured device.

Another objective of the invention is to provide a sectioned smoke cooker. That is, an oven portion and a chimney portion is separable from each other, such that the user is able to choose the desired function to work on the food by removing the undesired portion.

Other objects, advantages and novel features of the invention will become more apparent from the following detailed description when taken in conjunction with the accompanying drawings.

DETAILED DESCRIPTION OF PREFERRED EMBODIMENT

Figure 1:
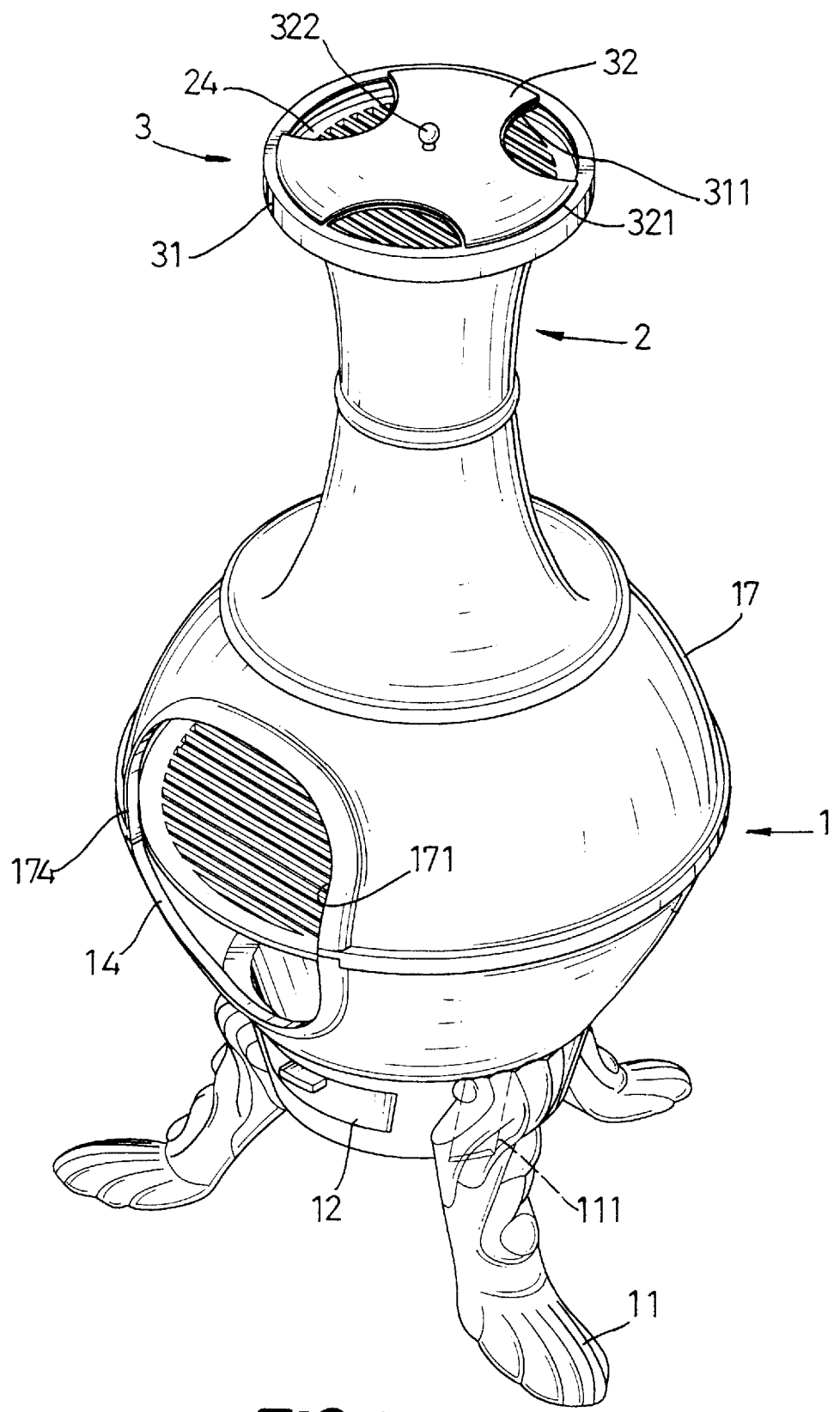
FIG. 1 is a perspective view of a smoke cooker with a chimney constructed in accordance with the present invention.

With reference to FIG. 1, a smoke cooker constructed in accordance with the present invention has an oven portion and a chimney portion detachably connected with the oven portion.

Figure 2:
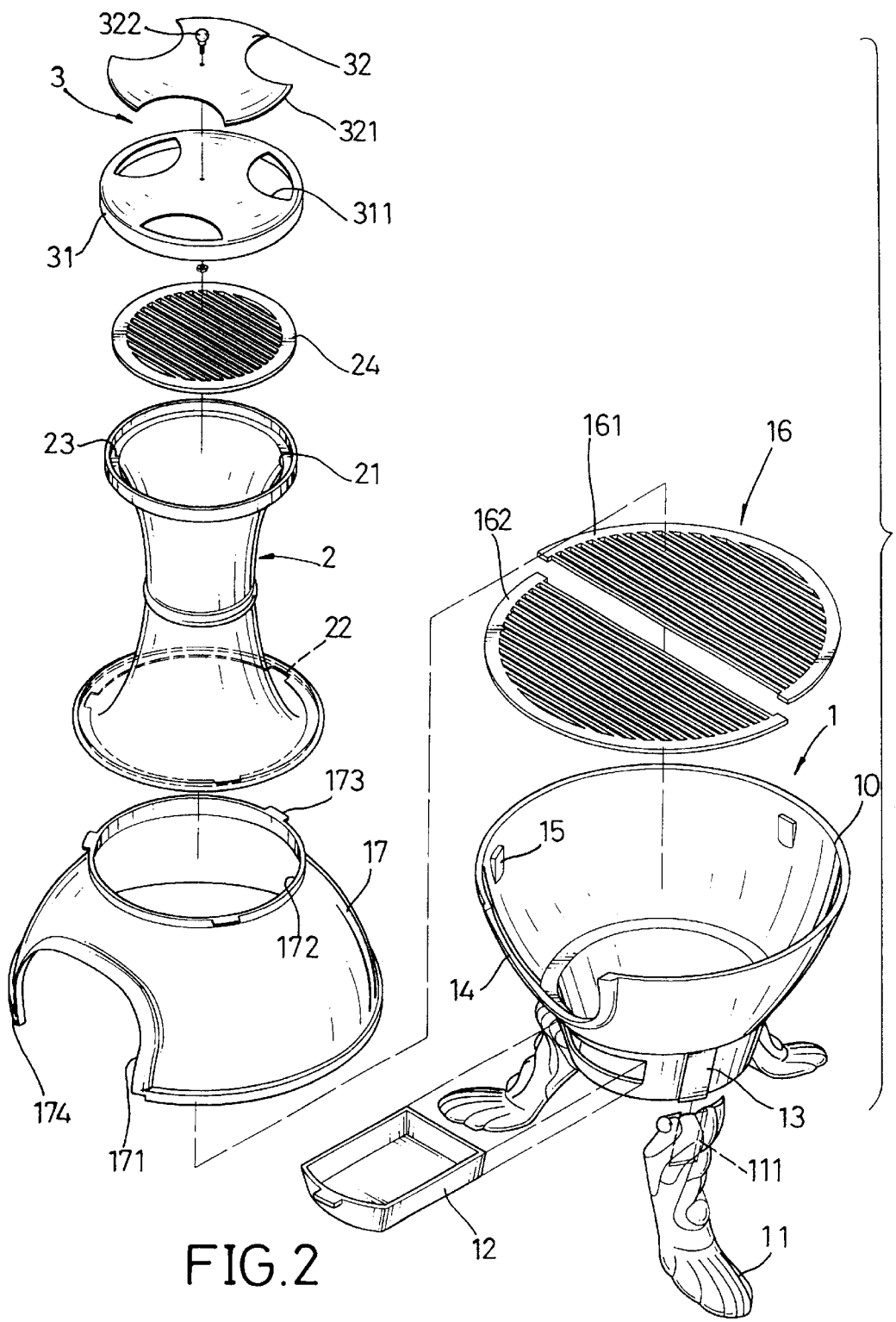
FIG. 2 is an exploded perspective view of the smoke cooker with a chimney of FIG. 1.
Figure 3:
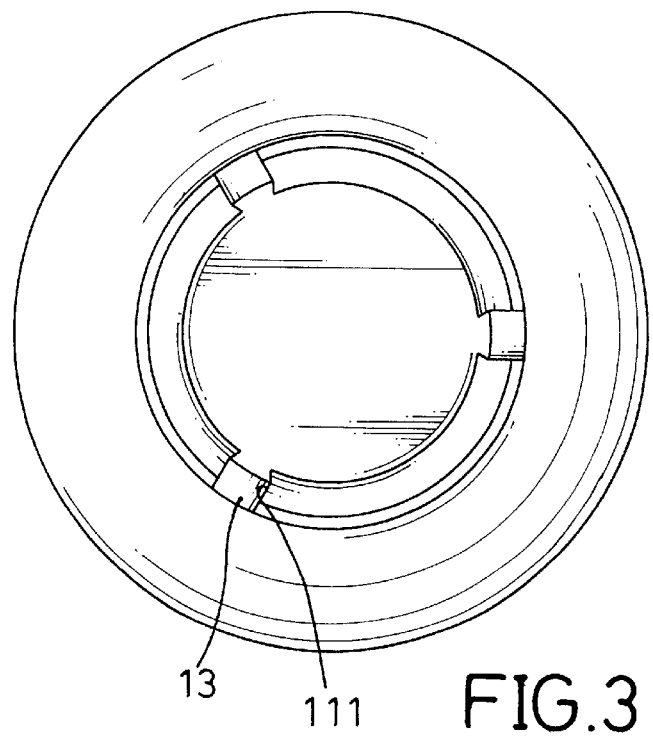
FIG. 3 is a top plan view of the engagement between the feet and the base.

With reference to FIG. 2, the oven portion has a bowl-like base (1) with feet (11) detachably connected to the base (1) and an ash container (12) removably received inside the base (1). Multiple dovetailed extensions (13) are formed on an outer periphery of the base (1) and each of the feet (11) has a dovetailed recess (111) defined to correspond to the dovetailed extensions (13), such that when the feet (11) are to be assembled with the base (1), the user just slides the dovetailed extensions (13) into a corresponding one of the dovetailed recess (111), as shown in FIG. 3. The base (1) further has a first cutout (14) defined in a side face of the base (1) and multiple supports (15) formed on an inner periphery of the base (1). A grill (16) is provided inside the base (1) and supported by the supports (15). The grill (16) is divided into a first and a second grills (161,162), such that the user is able to choose the area of the grill (16) to be used.

Figure 4:
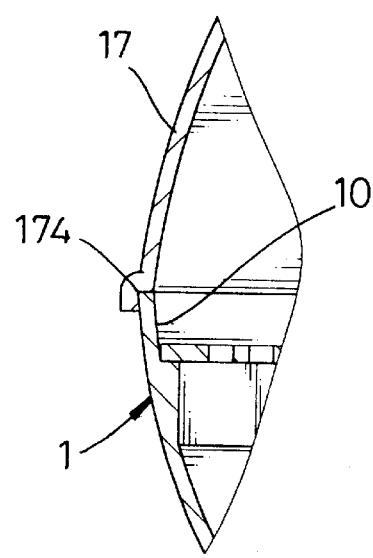
FIG. 4 is a partially cross-sectional view of the engagement between the base and the cover.

The base (1) still has a cover (17) mountable on top of the base (1) to form an oven. The cover (17) has a second cutout (171) defined to correspond to the first cutout (14) of the base (1), a through hole (172) communicating with the inside of the base (1) and multiple protrusions (173) formed on a periphery defaming the through hole (172) and extending out therefrom. The cover (17) has a first step (174) formed on a peripheral edge and corresponded to a second step (10) formed on a peripheral edge of the base (1) and complementary to the first step (174). Therefore, when the cover (17) is mounted on top of the base (1), the first and the second steps (174,10) mate with each other, as shown in FIG. 4. Furthermore, the first cutout (14) and the second cutout (171) of the base (1) and the cover (17) respectively formed a perfect opening of the oven portion.

The chimney portion has a chimney (2) and a lid assembly (3). The chimney (2) has a passage (21) defined to communicate with the through hole (172) of the cover (17), multiple L-shaped tracks (22) defined in a bottom face of the chimney (2) and correspond to the multiple protrusions (173) of the cover (17) and a recessed seat (23).

Figure 6:
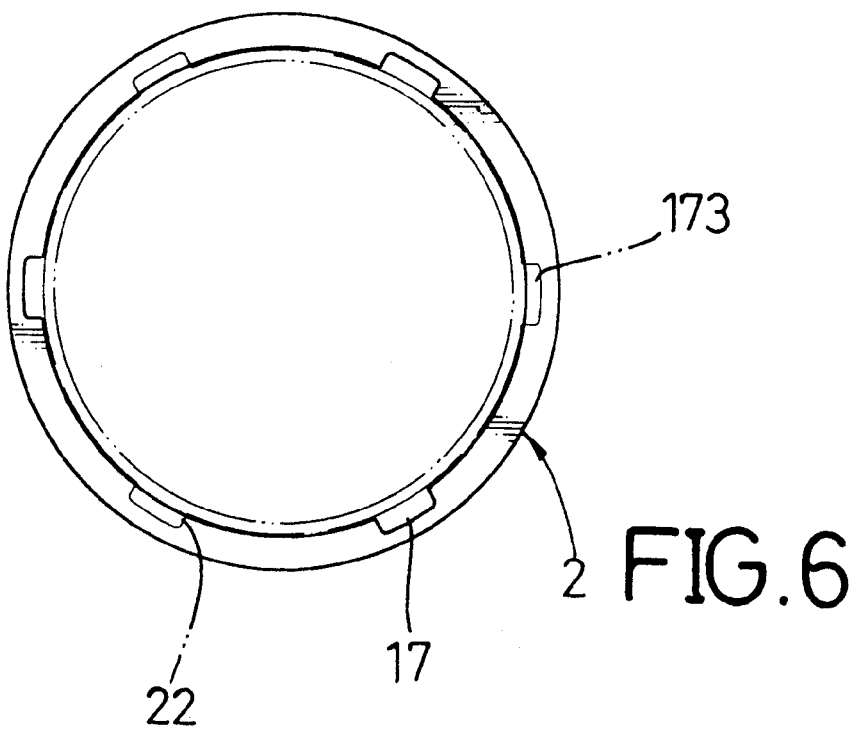
FIG. 6 is a top plan view of the engagement between the cover and the chimney.
Figure 5:
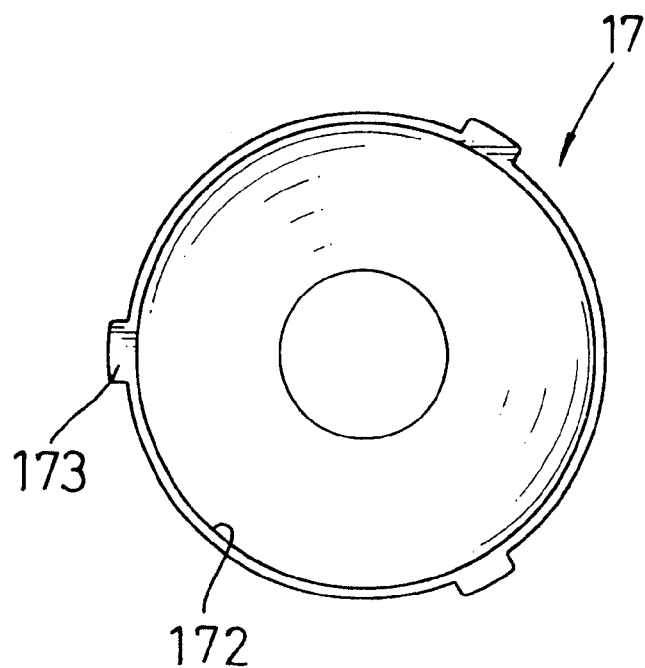
FIG. 5 is a top plan view of the base.
Figure 7:
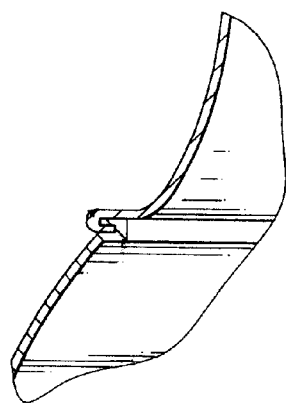
FIG. 7 is a partially cross-sectional view of the engagement between the cover and the chimney.

When the chimney (2) is assembled with the cover (17), as shown in FIGS. 5, 6 and 7, each of the protrusions (173) is first received in a corresponding one of the L-shaped tracks (22) and then a rotation to chimney (2) with respect to the cover (17), such that the protrusions (173) are then securely received in the L-shaped tracks (22) of the chimney (2) and the engagement between the chimney (2) and the cover (17) is thus secured.

A secondary grill (24) is placed on top of the recessed seat (23) so that the user is able to place food on top of the secondary grill (24) to have the food cured by smoke from the oven portion.

Figure 8:
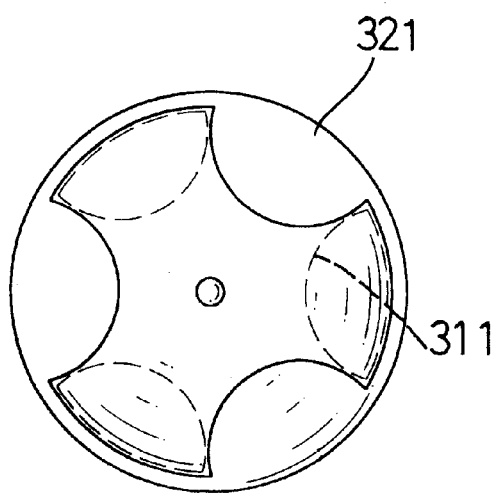
FIG. 8 is a top plan view of the lid assembly of the invention.
Figure 9:
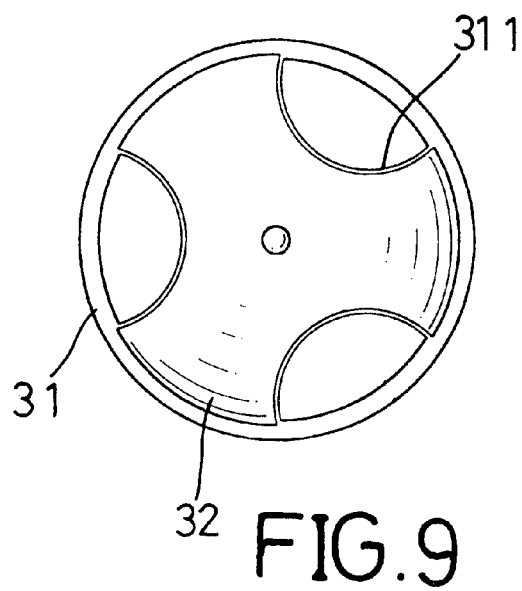
FIG. 9 is an operational top plan view of the lid assembly.

With reference to FIGS. 2, 8 and 9, the lid assembly (3) is able to cover the passage (21) of the chimney (2) and has a first layer (31) and a second layer (32) that is rotatably received inside the first layer (31). The first layer (31) has at least two openings (three are shown in the preferred embodiment of the drawing) (311) and the second layer (32) has at least two extending feet (three are shown in the preferred embodiment of the drawing)(321) alternately corresponding to the openings (311) of the first layer (31) and a boss (322) securely formed on a top of the second layer (32). When the first layer and the second layer (31,32) are assembled, the second layer (32) is underneath the first layer (31) and the boss (322) extends out from a top of the first layer (31) to be held by the user. When the foregoing assembly is finished, the user holds the boss (322) and rotates the boss (322), the second layer (32) will then alternately cover the openings (311) of the first layer (31) to allow the ventilation inside the smoke cooker.

Figure 10:
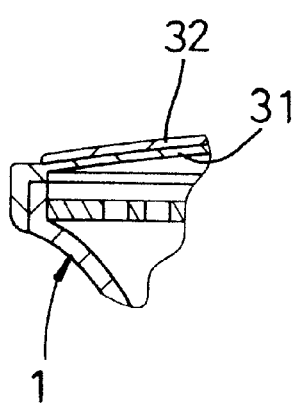
FIG. 10 is a partially cross sectional view of the engagement between the lid assembly and the chimney.

With reference to FIG. 10, after the lid assembly (3) is assembled, the lid assembly (3) mates with a periphery of the recessed seat (23) to that the lid assembly (3) covers the passage (21) of the chimney (2).

It is to be noted from the foregoing description that smoke cooker is able to separated from each other and after separation, each of the oven portion and the chimney portion has its own unique function. However, when in assembly, the smoke cooker still has its own function as well.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A smoke cooker with a chimney comprising:
   an oven portion having
      a base with feet detachably connected with an outer periphery of the base, a first cutout defined in a side face of the base and a first step formed on a peripheral edge of the base;
      an ash container removably received inside the base;
      a grill placed inside the base; and
      a cover detachably mounted on a top of the base and having a second cutout defined in a side face of the cover to correspond to the first cutout of the base, a through hole defined to communicate with the base and a second step formed on a peripheral edge to complimentarily correspond to the first step of the base so that after the engagement between the cover and the base, the first and second steps mate with each other and the first and second cutout form an opening;
   a chimney portion detachably connected with the oven portion and having
      a chimney detachably connected with the cover and having a passage defined to communicate with the through hole of the cover and a recessed seat formed on a peripheral edge of the chimney;
      a secondary grill received in the recessed seat; and
      a lid assembly detachably connected and mated with the recessed seat and having a first layer detachably engaged with the recessed seat and a second layer rotatably received inside the first layer.

2. The smoke cooker as claimed in claim 1, wherein each foot has a dovetailed recess defined to correspond to a dovetailed extension formed on an outer periphery of the base so as to allow the extensions to be slid into the dovetailed recess to finish the assembly therebetween.

3. The smoke cooker as claimed in claim 2, wherein multiple supports are formed inside the base to support the grill.

4. The smoke cooker as claimed in claim 3, wherein the grill has a first grill and a second grill detachably connected with the first grill so as to allow the user to choose an area of the grill to be used.

5. The smoke cooker as claimed in claim 3, wherein the cover has multiple protrusions extending out from a peripheral edge of the cover and the chimney has multiple L-shaped tracks defined in an inner face of the chimney to correspond to the protrusions of the cover whereby after the protrusions rest in the L-shaped tracks, a rotation of the chimney secures the engagement between the chimney and the cover.

6. The smoke cooker as claimed in claim 3, wherein the first layer of the lid assembly has multiple openings and the second layer has multiple extending feet formed to alternately correspond to the openings.

7. The smoke cooker as claimed in claim 2, wherein the grill has a first grill and a second grill detachably connected with the first grill so as to allow the user to choose an area of the grill to be used.

8. The smoke cooker as claimed in claim 7, wherein the cover has multiple protrusions extending out from a peripheral edge of the cover and the chimney has multiple L-shaped tracks defined in an inner face of the chimney to correspond to the protrusions of the cover whereby after the protrusions rest in the L-shaped tracks, a rotation of the chimney secures the engagement between the chimney and the cover.

9. The smoke cooker as claimed in claim 2, wherein the cover has multiple protrusions extending out from a peripheral edge of the cover and the chimney has multiple L-shaped tracks defined in an inner face of the chimney to correspond to the protrusions of the cover whereby after the protrusions rest in the L-shaped tracks, a rotation of the chimney secures the engagement between the chimney and the cover.

10. The smoke cooker as claimed in claim 2, wherein the first layer of the lid assembly has multiple openings and the second layer has multiple extending feet formed to alternately correspond to the openings.

11. The smoke cooker as claimed in claim 1, wherein multiple supports are formed inside the base to support the grill.

12. The smoke cooker as claimed in claim 11, wherein the grill has a first grill and a second grill detachably connected with the first grill so as to allow the user to choose an area of the grill to be used.

13. The smoke cooker as claimed in claim 12, wherein the cover has multiple protrusions extending out from a peripheral edge of the cover and the chimney has multiple L-shaped tracks defined in an inner face of the chimney to correspond to the protrusions of the cover whereby after the protrusions rest in the L-shaped tracks, a rotation of the chimney secures the engagement between the chimney and the cover.

14. The smoke cooker as claimed in claim 11, wherein the cover has multiple protrusions extending out from a peripheral edge of the cover and the chimney has multiple L-shaped tracks defined in an inner face of the chimney to correspond to the protrusions of the cover whereby after the protrusions rest in the L-shaped tracks, a rotation of the chimney secures the engagement between the chimney and the cover.

15. The smoke cooker as claimed in claim 11, wherein the first layer of the lid assembly has multiple openings and the second layer has multiple extending feet formed to alternately correspond to the openings.

16. The smoke cooker as claimed in claim 1, wherein the grill has a first grill and a second grill detachably connected with the first grill so as to allow the user to choose an area of the grill to be used.

17. The smoke cooker as claimed in claim 16, wherein the cover has multiple protrusions extending out from a peripheral edge of the cover and the chimney has multiple L-shaped tracks defined in an inner face of the chimney to correspond to the protrusions of the cover whereby after the protrusions rest in the L-shaped tracks, a rotation of the chimney secures the engagement between the chimney and the cover.

18. The smoke cooker as claimed in claim 1, wherein the cover has multiple protrusions extending out from a peripheral edge of the cover and the chimney has multiple L-shaped tracks defined in an inner face of the chimney to correspond to the protrusions of the cover whereby after the protrusions rest in the L-shaped tracks, a rotation of the chimney secures the engagement between the chimney and the cover.

19. The smoke cooker as claimed in claim 18, wherein the first layer of the lid assembly has multiple openings and the second layer has multiple extending feet formed to alternately correspond to the openings.

20. The smoke cooker as claimed in claim 1, wherein the first layer of the lid assembly has multiple openings and the second layer has multiple extending feet formed to alternately correspond to the openings.

* * * * *